2,776,047

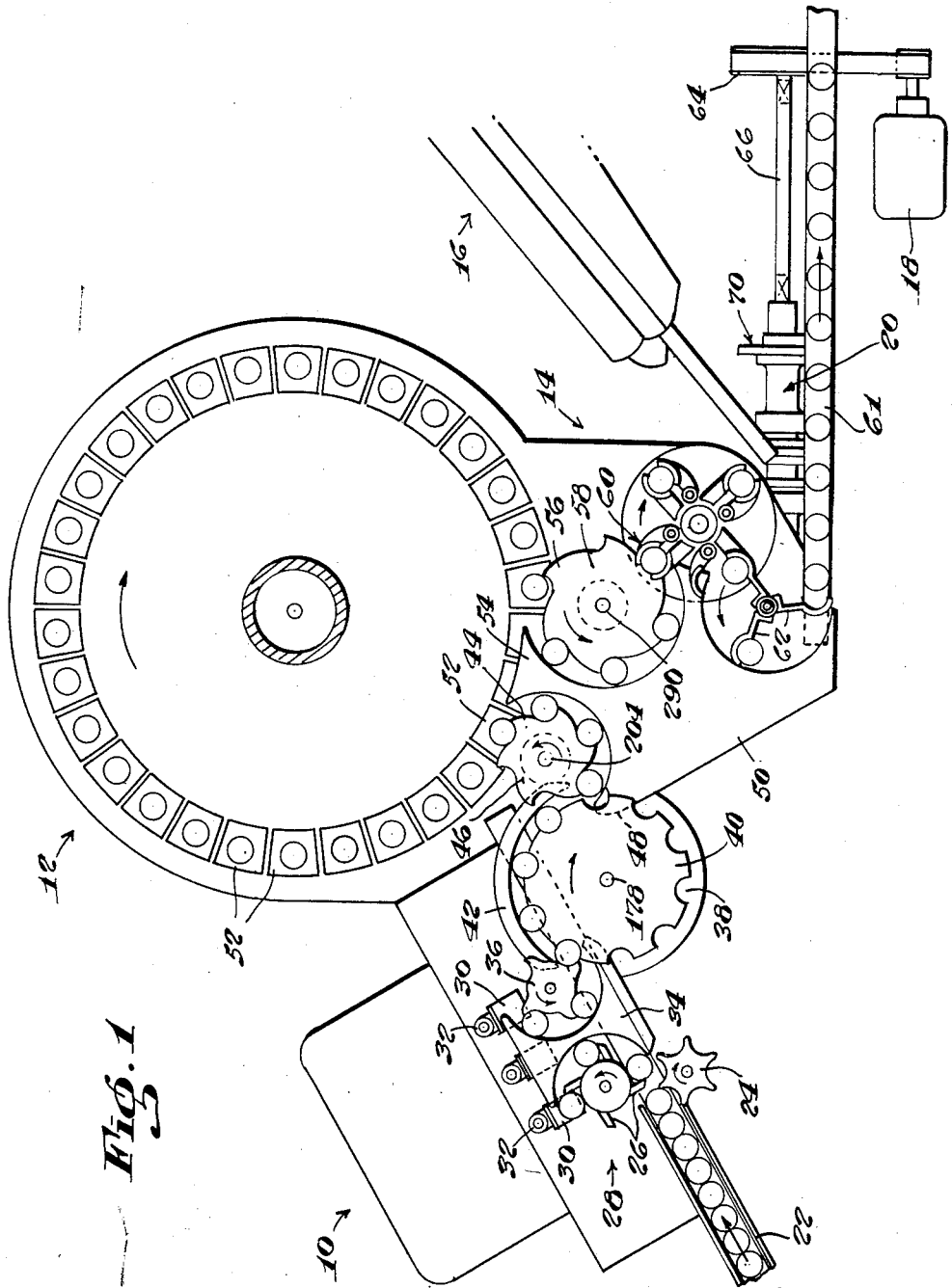

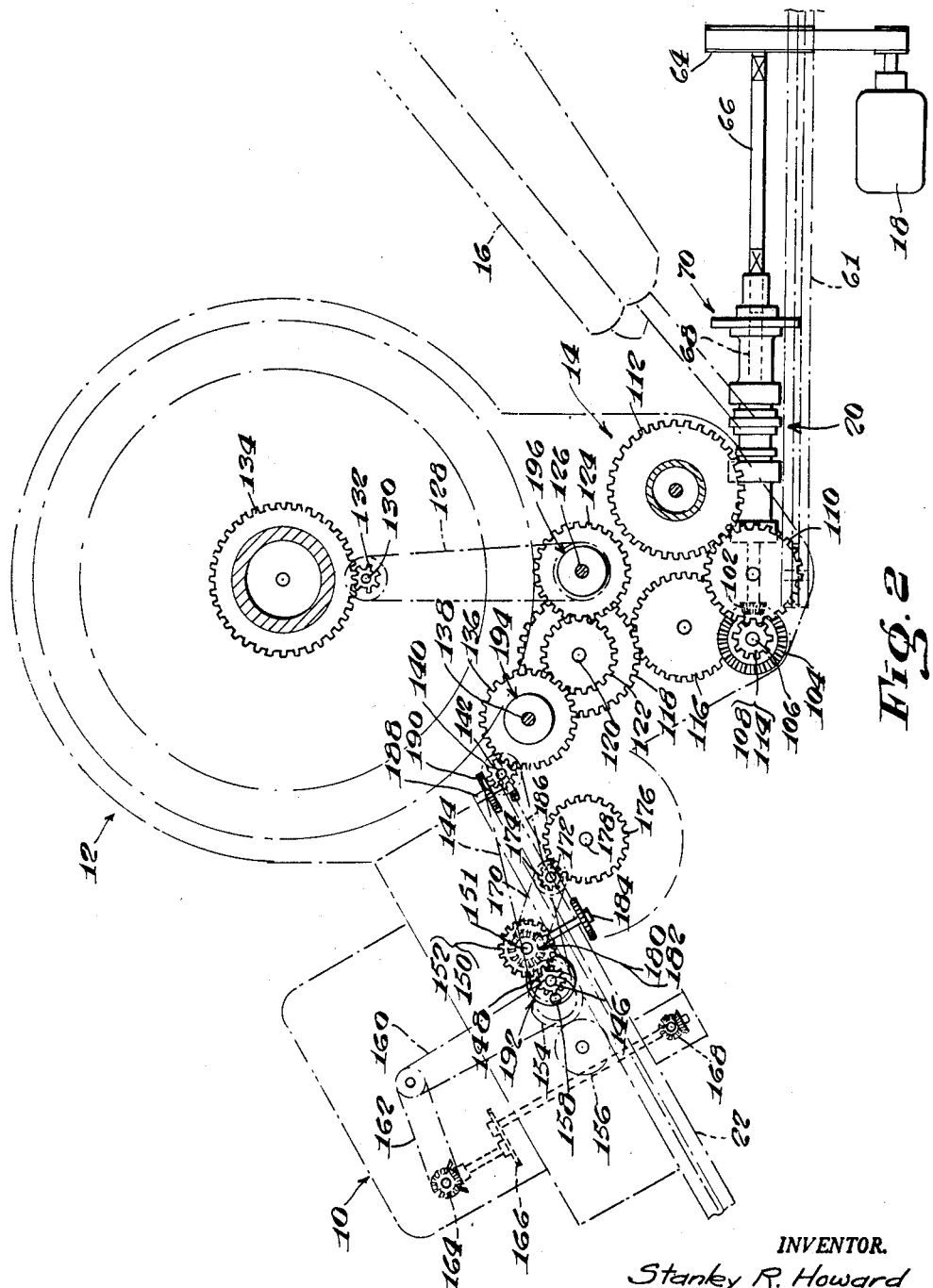

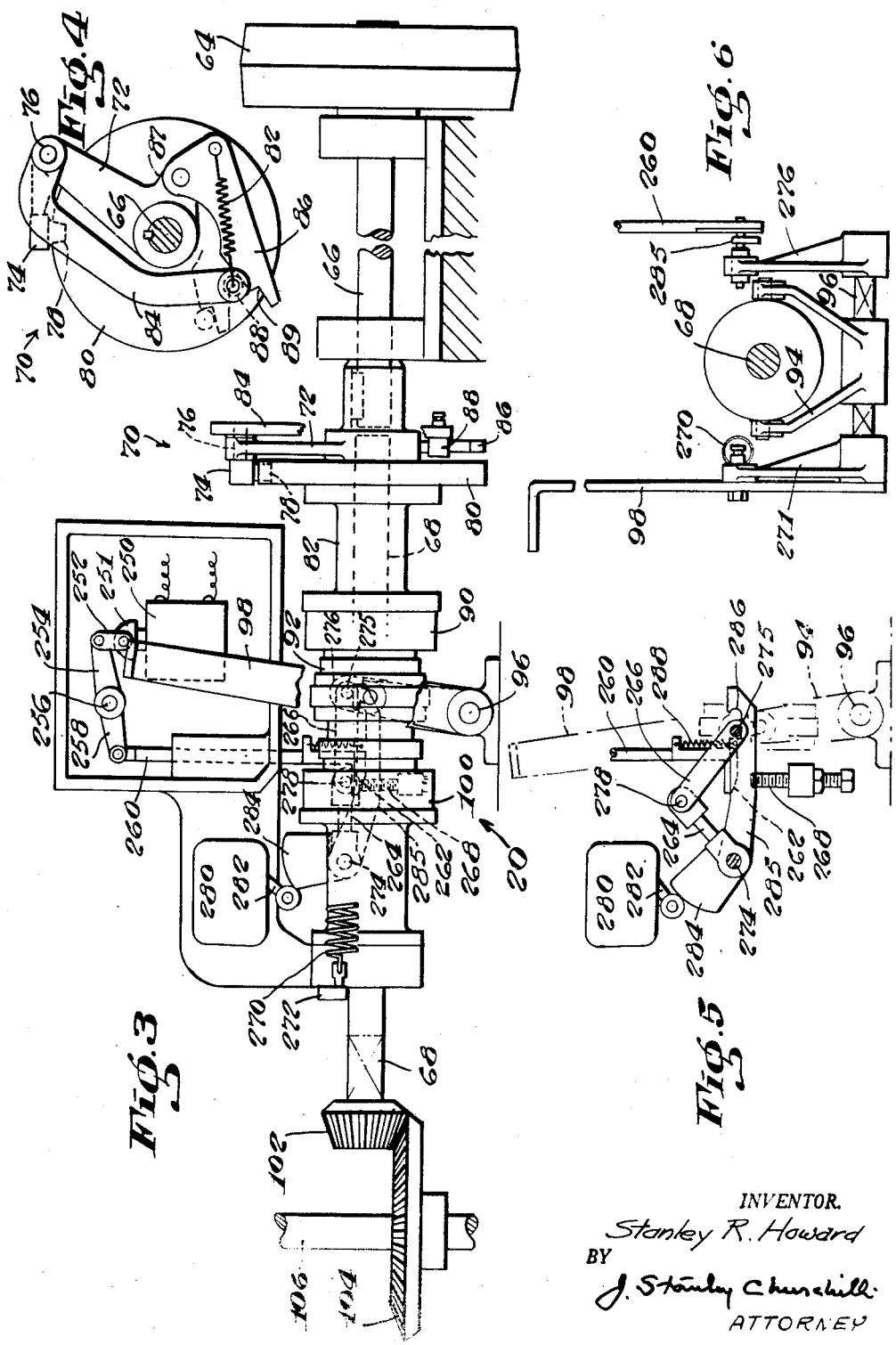

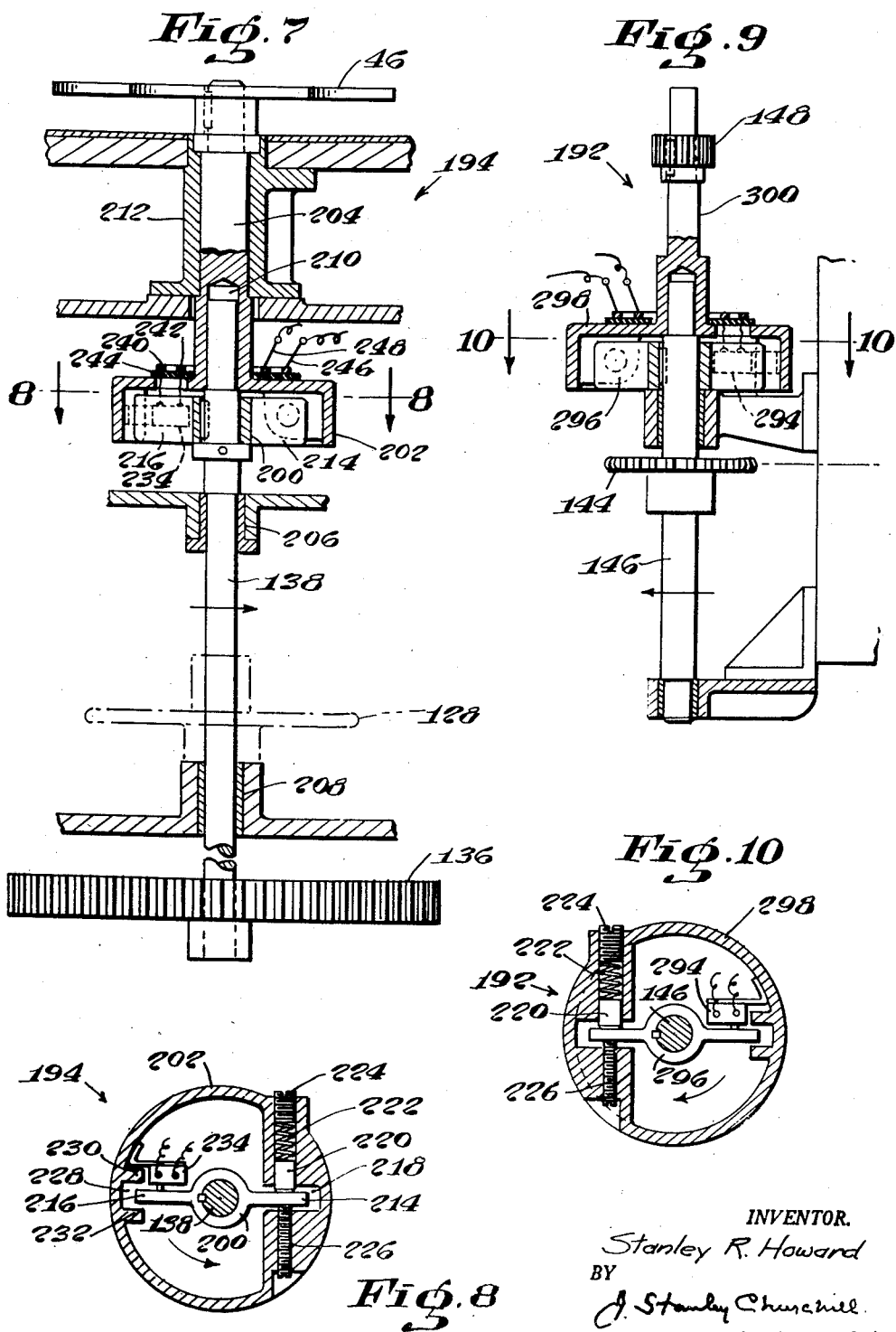

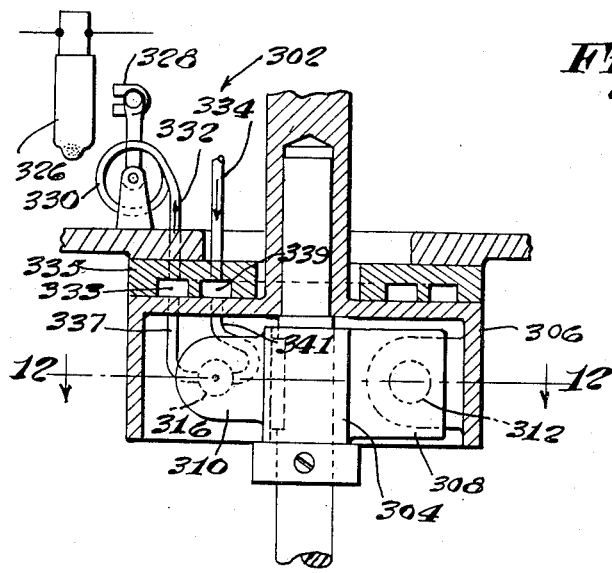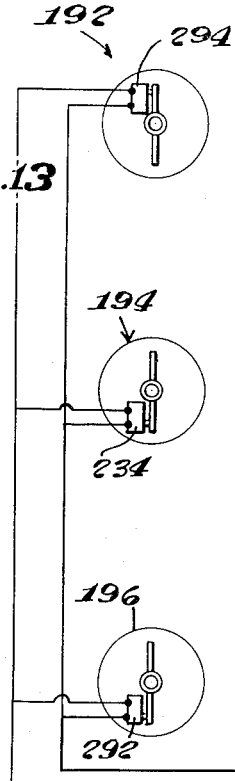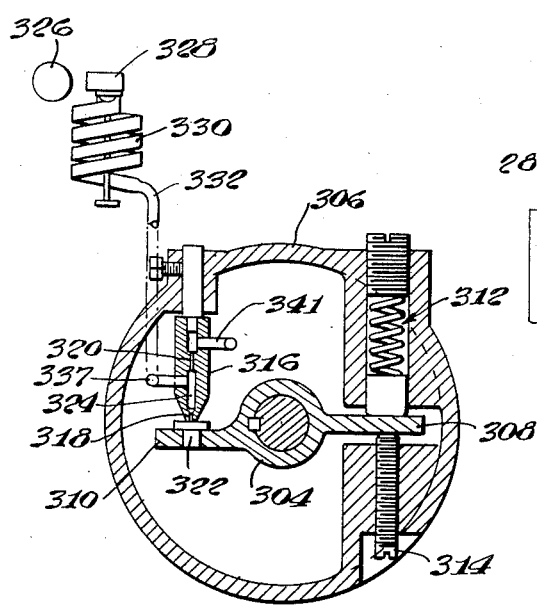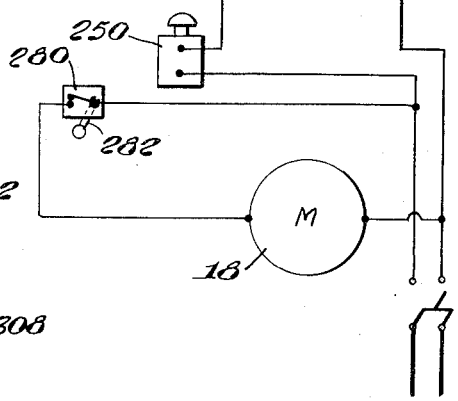
INVENTOR.
Stanley R. Howard
BY J. Stanley Churchill
ATTORNEY

United States Patent Office 2,776,047
Patented Jan. 1, 1957

CONTAINER HANDLING MACHINES

Stanley R. Howard, Milton, Mass., assignor to Pneumatic Scale Corporation, Limited, Quincy, Mass., a corporation of Massachusetts Original application December 10, 1949, Serial No. 132,242, now Patent No. 2,762,497, dated September 11, 1956. Divided and this application December 13, 1955, Serial No. 552,920

3 Claims. (Cl. 198—232)

This invention relates to container handling machines.

The object of the invention is to provide a container handling machine with novel and superior control mechanism for quickly terminating the operation of the machine in the event that a jam occurs in the progress of the containers through the machine to thereby prevent breakage of the containers or damage to the operating parts of the machine in a rapid, efficient and practical manner.

With this general object in view and such others as may hereinafter appear, the invention consists in the control mechanisms for a container handling machine and in the various structures, arrangements and combinations of parts hereinafter described and particularly defined in the claims at the end of this specification.

In the drawings illustrating the preferred embodiment of the invention:

Fig. 1 is a plan view of a container handling machine embodying the present invention;

Fig. 2 is a plan view illustrating the driving mechanism for the machine shown in Fig. 1;

Fig. 3 is a front view of a portion of the main driving mechanism illustrating a clutch and brake mechanism forming a part of the present safety control apparatus;

Fig. 4 is a side elevation of a separable connection forming a part of the main driving mechanism;

Fig. 5 is a detail view in front elevation of a portion of the clutch operative mechanism in a different position of operation;

Fig. 6 is a side elevation of the clutch operating mechanism;

Fig. 7 is a cross sectional view of a safety device embodying the present invention as applied to a rotary transfer member driving shaft;

Fig. 8 is a cross sectional view as taken on the line 8—8 of Fig. 7;

Fig. 9 is a cross sectional view of the safety device as applied to a shaft driving one of the operating mechanisms of the machine;

Fig. 10 is a cross sectional view taken on the line 10—10 of Fig. 9;

Fig. 11 is a cross sectional view of a modified form of safety device embodying the present invention;

Fig. 12 is a cross sectional view taken on the line 12—12 of Fig. 11; and

Fig. 13 is a wiring diagram showing the safety devices connected with the clutch and brake solenoid and a switch for opening the circuit to the motor when the clutch is disengaged and the brake applied.

In general the present invention contemplates novel control mechanism for a container handling machine of the type embodying a plurality of successive mechanisms for operation upon successive containers, such as a machine for cleaning, filling and capping bottles, having bottle conveying and transferring mechanism for continuously advancing the bottles in spaced relation through the machine and in timed relation to the operating mechanisms. The conveying and transferring mechanism may include a plurality of cooperating rotary spiders or transfer disks having pockets shaped to engage and transfer the containers from one operating mechanism to another. In practice in the event that a container is defective, for example deformed in shape or non-uniform in size, or in the event that a container is inadvertently displaced, such container may become jammed between adjacent transfer disks, thus causing breakage of the container or damage to the operating parts.

In accordance with the present invention individual control units comprising safety or detecting units are provided at selected transfer points or in connection with different operating mechanisms of the machine where a jam is likely to occur, each control unit being capable of adjustment as to sensitivity so as to selectively detect an abnormal or excessive load at such predetermined points and adapted to effect immediate disengagement of the main driving clutch, braking of the main driving shaft and opening of the circuit to the driving motor before any breakage of the containers or damage to the operating parts can occur. In the preferred embodiment of the invention the detecting units may include relatively yieldable and adjustable driving connections adapted to close a switch upon a relatively small relative movement of the driving and driven elements to effect substantially immediate termination of operation of the machine and may be connected to operate either a microswitch or a pneumatically operated switch of the type including a pressure sensitive element arranged to be actuated upon extremely slight relative movement of the driving and driven members of a safety detecting unit. Upon operation of the present detecting units, when the jam is cleared the driving and driven elements are adapted to immediately return to their original driving relationship whereby displacement of the transfer elements and the operating mechanisms relative to each other is avoided and the timed relationship is maintained.

Referring now to the drawings, in general the present invention is illustrated as embodied in a container handling apparatus including a group of machines or mechanisms illustrated in Fig. 1 as comprising container cleaning mechanism, indicated generally at 10, container filling mechanism, indicated generally at 12, and container closing or capping mechanism, indicated generally at 14. The latter includes cap feeding mechanism 16 for supplying closures to the capping mechanism, and the entire group of mechanisms are connected by common driving mechanism including a driving motor 18 and a clutch and brake unit, indicated generally at 20.

In the operation of the illustrated container handling apparatus the containers, such as bottles, are moved continuously and at relatively high speed through the various mechanisms, and as herein shown, the bottles are introduced into the apparatus from a continuously driven supply conveyor 22 on which the bottles are disposed in contiguous relation. In operation, the foremost bottle in the line is engaged by a continuously driven rotary star wheel 24 provided with a plurality of equally spaced teeth arranged to enter between successive bottles as they are delivered and to release such bottles in timed relation to the operation of the bottle cleaning machine. The bottles thus released are presented into the path of arms 26 of a rotary feeding device indicated generally at 28 which operates to transfer successive bottles onto the platforms 30 of successive supporting brackets 32 forming a part of the container cleaning machine, the bottles being guided onto the platform by a guide rail or plate 34, as shown.

The container cleaning machine 10, herein diagrammatically illustrated, may and preferably will comprise a pneumatic cleaning machine of the type illustrated and described in the Everett United States patent, No. 2,354,308, July 25, 1944, to which reference may be had for a more complete disclosure of the machine and the mode of operation thereof. Only sufficient portions of such machines are herein illustrated and described as will enable the present invention to be understood.

In general in such cleaning machine, provision is made for presenting successive containers in radial alignment with individual cleaning nozzles on a rotatable supporting member or carrier by which the containers are rotated into and inverted position. During the progress of the containers into and from an inverted position provision is made for injecting a stream of air into the interior of the container to effect discharge of dust and foreign particles through the mouth of the container.

After cleaning, the bottles are removed from the platforms 30 as they arrive at the discharge station by the engagement of each bottle with an extended portion of the guide rail 34, and successive bottles thus removed are transferred by a rotary toothed wheel 36 into successive equally spaced arcuate pockets or cutouts 38 of a rotary transfer member 40. The transfer member 40 is continuously driven in a clockwise direction viewing Fig. 1 and in timed relation to the discharge of the bottles from the cleaning machine and is arranged to cooperate with a stationary guide rail 42 to guide and convey the bottles into the path of the successive arms 44 of a rotary intake spider 46 arranged to be rotated in a counterclockwise direction in timed relation to the operation of the filling machine 12. As shown in Fig. 1, the bottles are guided out of the pockets 38 by an extended portion 48 of a guide rail or plate 50 at which time they are picked up by successive teeth of the intake spider 46 and disposed upon successive continuously moving elevating platforms 52 forming a part of the bottle filling machine 12.

The bottle filling machine, as herein diagrammatically illustrated, may and preferably will comprise a rotary vacuum filling machine of the type illustrated and described in the Everett United States patent, No. 2,136,421, issued November 15, 1936, to which reference may be had for a more complete description of the construction and mode of operation of such filling machines, only sufficient portions thereof being herein illustrated and described as will enable the present invention to be understood. In general such filling machines are provided with a plurality of filling heads arranged to fill the bottles during continuous movement of the filling heads and the bottles as they are supported upon the continuously rotating bottle supporting and elevating platforms 52, the filling operation being effected by the evacuation of the bottle when the latter is elevated into engagement with a filling head in accordance with the well known vacuum filling principle.

From the description thus far it will be observed that the bottles are positively controlled and maintained in spaced relation during their conveyance through the bottle cleaning machine and through the bottle filling machine and during their transfer from one machine to the other. After being filled, the bottles are guided off the supporting platforms 52 of the filling machine by the engagement of successive containers with an extended portion 54 of the guide plate 50 and are engaged by successive arms 56 of a continuously rotated spider or transfer member 58 arranged to transfer the bottles directly from the filling machine into the clamping jaws 60 of the rotary closure applying machine 14.

The closure applying machine 14, herein diagrammatically illustrated, may and preferably will comprise a rotary machine of the type illustrated and described in the Everett United States patent, No. 2,082,048, issued June 1, 1937, to which reference may be had for a complete disclosure of the structure and mode of operation of such a machine. In general such a machine is arranged to apply screw closures or caps to containers, such as bottles, and is provided with a plurality of successive clamping jaws 60 forming a part of a revoluble closure applying machine having a plurality of closure applying devices adapted to effect the application of the closures to the bottle held by the clamping jaws during the revoluble movement of the clamping jaws while in vertical alignment with the closure applying devices.

After being provided with a closure the filled and closed bottles are transferred from the closure applying machine 14 onto the continuously moving discharge conveyer 61 by transfer arms 62 of a modified motion transfer mechanism which is arranged to move the containers in timed relation to the operation of the closure applying machine and to slow down the movement of the containers as they are carried around with the transfer mechanism to deposit them upon the conveyer 61. The containers thus deposited upon the conveyer 61 may be discharged from the machine or they may be carried to other machines, such as to a labeling machine, for subsequent operations on the containers.

Referring now to Fig. 2, the main driving mechanism includes the electric motor 18 belted to a pulley 64 fast on a shaft 66 which is connected to the main driving shaft 68 in axial alignment therewith through a separable connection or overload safety unit 70 which is designed to be disengaged when an abnormally excessive load is encountered. As shown in Figs. 3 and 4, the overload safety unit 70 includes an arm 72 fixed to the shaft 66 and provided with a pawl 74 fast on a pivot pin 76 in the arm 72 and engageable with a notch 78 in a disk 80 secured to one end of a flanged member 82 loosely mounted on the the shaft 68. The pawl 74 is slightly tapered as shown and is normally urged into driving engagement with the notch 78 by a spring 82 connected to the free end of a lever 84 also fast on the pivot pin 76. In operation, when an abnormally excessive load is encountered the pawl 74 will slip out of the correspondingly shaped notch 78 against the tension of the spring. Provision is also made for locking the pawl out of engagement with the disk 80 in order to prevent successive engagements of the pawl in the notch each revolution after it has been initially disengaged and, as herein shown, the pawl locking mechanism includes a latch arm 86 pivotally mounted in a short arm 87 formed integrally with the driving arm 72. The latch arm 86 is arranged to cooperate with a roller 88 carried by the free end of the lever 84, the latch being normally maintained in an inoperative position by the roller 84 urged thereagainst by the spring 82 secured at one end to the latch arm as shown in Fig. 4. Upon rocking of the pawl 74 and lever 84 in a clockwise direction when an overload occurs, the latch arm will be rocked upwardly by the spring 82 to engage the roller 88 in the notched portion 89 of the latch arm 86, thus maintaining the pawl 74 in its outwardly rocked position. After the overload condition has been corrected, the pawl and latch may be manually reset in driving engagement to continue operation of the machine.

As illustrated in Fig. 3, the other end of the flanged member 82 forms the driving member 90 of the clutch and brake unit 20 arranged to cooperate with a driven member 92 keyed to the shaft 68 and arranged to be shifted into and out of engagement with the driving member 90 by a shifter arm 94 fast on a rocker shaft 96 and a manually operated clutch lever 98 also fast on the rocker shaft 96. When the clutch member 92 is shifted to its disengaged position provision is made for simultaneously braking the main driving shaft 68, and as herein shown, this may be accomplished by providing a stationary braking unit 100 arranged to cooperate with the left hand end of the shiftable member 92, the latter being keyed to the shaft 68.

As shown in Figs. 2 and 3, the main driving shaft 68 is provided with a bevel gear 102 which meshes with a bevel gear 104 fast on a vertical shaft 106 rotatably supported in the machine frame. The closure applying machine indicated generally at 14 is driven through a gear train including a pinion 108 fast on the upper end of the shaft 106 which cooperates with an intermediate gear 110. The latter is arranged to mesh with a gear 112 forming a part of the closure applying machine and which corresponds to gear 424 shown in Fig. 3 of the drawings in the Everett patent, No. 2,082,048, above referred to, and by which the rotation of the machine and operation of the individual closure applying units is effected. Provision is also made for driving the bottle filling machine 12 from the vertical drive shaft 106, the vertical shaft having a pinion 114 at its lower end similar to the pinion 108 and which meshes with a gear 116, the latter arranged to drive a gear 118 fast on the lower end of a vertical shaft 120. The shaft 120 is also provided with a gear 122 meshing with a gear 124 fast on a vertical shaft 126 upon which the rotary transfer member 58 is mounted. The shaft 126 is connected by a chain and sprocket drive 128 to a shaft 130 provided with a pinion 132 which meshes with a gear 134 forming a part of the driving mechanism of the filling machine and which corresponds to the gear 60 shown in Fig. 4 of the drawings of the Everett patent, No. 2,136,421, above referred to, and which is arranged to effect continuous rotation of the filling units and bottle supporting and elevating members therein disclosed.

The bottle cleaning machine 10 is also arranged to be driven from the gear 122 fast on the shaft 120 arranged to mesh with a second gear 136 fast on a shaft 138 on which the rotary transfer member 44 is mounted. The gear 136 meshes with a pinion 140 fast on a shaft 142 which is connected by a chain and sprocket drive 144 to a vertical shaft 146 provided with a pinion 148 arranged to mesh with a gear 150 fast on a drive shaft 151 which corresponds to the shaft 306 shown in Fig. 3 of the drawings in the Everett patent, No. 2,354,308, above referred to, and which effects rotation of the discharge member 36 and the intake spider 28 of the cleaning machine 10 through the gear train 152, 154, 156 and also effects rotation of the cleaning spider as disclosed in said patent. As illustrated in Fig. 2, the star wheel 24 is driven from a shaft 158 on which the gear 154 is mounted through chain and sprocket drives 160, 162, bevel gears 164, chain and sprocket drive 166 and through bevel gears 168. Rotation of the transfer member 40 is effected through a chain and sprocket drive 170 from the shaft 151 to a shaft 172, the latter being provided with a pinion 174 arranged to mesh with a gear 176 fast on a vertical shaft 178 on which the continuously rotatable transfer member 40 is mounted.

The intake conveyer 22, as herein shown, may be driven from the vertical drive shaft 151 through connections including bevel gears 180, 182, the latter being fast on a horizontal shaft 184 connected by a chain and sprocket drive 186 to the drive shaft 188 of the conveyer 22. The conveyer 22 may and preferably will comprise a metal chain-like type of belt which runs over a driving sprocket 190 fast on the shaft 188 and an idler sprocket, not shown, disposed at the other end of the conveyer.

From the description thus far it will be observed that the operating mechanisms of the bottle handling apparatus including the cleaning machine 10, filling machine 12, and the capping machine 14 are continuously driven from the main driving mechanism through the main driving shaft 68 in accurately timed relation to each other, and that the bottles are positively controlled and maintained in accurately spaced relation during their transfer from one machine to another and during their entire progress through the machine, so that they are maintained out of contact avoiding excessive noise and breakage.

In accordance with the present invention provision is made for quickly terminating the operation of the machine in the event of a jam of a bottle or bottles at selected points, and as herein shown, safety control units or couplings are provided at a plurality of selected points in the apparatus. As illustrated in Fig. 1, one of the safety control units, indicated generally at 192, may be mounted on the vertical drive shaft 146 for detecting an abnormal load at this point, as may occur in the event of a jam at the intake or discharge points of the cleaning machine 10. A second safety control unit, indicated generally at 194, may be mounted on the intake spider shaft 138 for detecting a jam between the transfer disk 46 and its cooperating bottle transferring elements, and a third safety control unit, indicated generally at 196 may be mounted on the transfer disk shaft 126 for detecting a jam between the transfer disk 58 and its cooperating bottle transferring elements.

In general the safety control units 192, 194, 196 comprise couplings having relatively movable driving and driven elements, the driven member being adapted to yield a relatively small increment of movement upon encountering an excessive or abnormal load, such relative movement being arranged to close a circuit for energizing a solenoid adapted to effect immediate release of the clutch 90, application of the brake 100 and opening of the circuit to the driving motor 18, thereby preventing breakage of the bottles or damage to the operative parts of the apparatus.

As illustrated in detail in Figs. 7 and 8, a preferred design of safety control unit or coupling which may be employed for cooperation with either or both of the transfer disks 46 or 58, herein shown as employed for cooperation with the transfer disk 46, includes a driving member 200 keyed to the vertical shaft 138 and a cooperating hollow hood shaped driven member 202 surrounding the driving member. The cooperating driven member 202 is formed on the lower end of a transfer disk spindle 204. The shaft 138 is journalled in bearing members 206, 208 in the machine frame and is rotated in a counterclockwise direction through the gear train including the gear 136 fast on the lower end of the shaft 138, as previously described. The upper end of the shaft 138 is received in a bored opening 210 formed in the lower end of the spindle 204, the spindle being rotatably supported in a bearing member 212 attached to the machine frame and having the transfer disk 46 keyed to the upper end thereof, as clearly shown in Fig. 7. As shown in Fig. 8, the driving member 200 is provided with opposed radially extended fins 214, 216, one of the fins 214 being extended into a clearance slot 218 formed in the driven member 202 and arranged in driving engagement with a spring pressed plug 220 slidably mounted in a bore formed in the driven member. The spring 222 is interposed between the plug and a set screw 224 for convenience in adjusting the compression of the spring. A second adjusting screw 226, also carried by the driven member 202, is arranged to engage the opposite side of the fin 214 for positioning and retaining the member in operative driving engagement.

The opposite radially extended fin 216 projects into a clearance slot 228 formed by lugs 230, 232 on the inner periphery of the hollow driven member 202 and is arranged to cooperate with a microswitch 234 carried by the driven element 202. The microswitch 234 is of the normally closed type and is held in an open position by engagement with the radial fin 216 during normal operation of the machine. The contacts of the microswitch 234 are connected by leads to separate collector rings 240, 242 respectively which are mounted to rotate with the driven member and insulated therefrom and from each other by an insulating plate 244. Stationary brushes 246, 248 cooperating with the collector rings 240, 242, as illustrated are connected in a circuit to a solenoid 250, see Figs. 3 and 13, arranged to be energized upon closing of the circuit at the microswitch 234 and to effect operation of the clutch and brake unit 20 to quickly bring the machine to rest in the event of a jam at the transfer disk 46.

Referring now particularly to Fig. 3, the armature 251 of the solenoid 250 is connected by a link 252 to one arm 254 of a two armed lever pivotally mounted at 256, the second arm 258 being connected to an elongated vertically depending member 260 having a hook portion 262 at its lower end arranged to cooperate with a toggle linkage 264, 266 normally maintained in a dead center position, or slightly beyond dead center, against an adjustable stop stud 268 when the clutch is in its engaged position, as illustrated in Fig. 3. A relatively heavy spring 270 is connected between the clutch lever arm 271 and a member 272 attached to and extended from a stationary portion of the machine, the spring being elongated under tension when the clutch is engaged and the toggle linkage is in its dead center position, as illustrated. One end of the toggle linkage is carried on a fixed pivot pin 274 and the other end is connected by a pin 275 to an arm 276 fast on the clutch lever rocker shaft 96. The hook portion 262 of the vertical member 260 is normally disposed slightly below the toggle center connecting pin 278 when in normal operating position. Thus, in the operation of the machine, when a jam occurs to effect slight relative movement between the driving and driven members 200, 202 of the safety control unit and closing of the circuit at the microswitch 234, the solenoid 250 will be energized to draw its armature 251 downwardly and effect upward movement of the hook member 262 against the toggle pin 278 to break the toggle upwardly, the relatively heavy spring 270 effecting rapid rocking of the clutch lever 98 and the movable clutch element 92 to the left, viewing Fig. 3, to disengage the clutch element 90 and to engage the brake element 100, thereby bringing the machine to rest.

As also illustrated in Fig. 3, provision is made for opening the circuit to the driving motor 18 upon shifting of the clutch lever 98 to terminate operation of the machine, and this may preferably be accomplished by a switch 280 having a switch arm 282 included in the motor circuit, see Fig. 13. The switch 280 is mounted to cooperate with a cam member 284 fast on the fixed pivot pin 274 so that in operation when the pin 274 is rocked upon breaking of the toggle linkage, the cam 284 will engage the switch arm 282 to open the switch and shut off the motor 18. Upon return of the clutch lever 98 to clutch engaging position, the switch arm 282 will likewise return to its circuit closing position to again start the motor 18.

Provision is also made in the preferred embodiment of the invention for preventing movement of the clutch lever 98 to the right hand or engaged position, viewing Fig. 3, until such time as the jam is cleared and the microswitch 234 is again in its open position, and as herein shown, a horizontally arranged arm 285 having a hook portion 286 at its free end is pivotally mounted on the pivot pin 274 and is urged to be rocked upwardly by a spring 288 connected to the vertical hook member 260. The arm 285 is normally held in its inoperative or downwardly rocked position by engagement with the lower end of the vertical member 260. Upon lifting of the member 260 and breaking of the toggle linkage to shift the clutch operating elements to the left, the pin 275 at the movable end of the toggle is moved to the left, as illustrated in Fig. 5, permitting the arm 285 to rock upwardly and to present its hook portion 286 into the path of the toggle pin 275. Thus, in operation should the operator attempt to manually shift the clutch lever 98 to start the machine before the jam is cleared and before the solenoid 250 is deenergized, the end pin 275 will be engaged by the hook 286 to prevent engagement of the clutch. Upon clearing of the jam and restoring the machine to normal operating condition, the vertical hook member 260 will again be moved downwardly to rock the hook 286 to its inoperative position whereupon the clutch lever 98 may be moved to again start the machine and to reset the toggle elements to their dead center position.

From the description thus far it will be observed that in operation, the machine will be quickly brought to rest in the event of a jam at a point adjacent the transfer disk 46, the cooperating driving and driven elements 200, 202 of the control unit 194 yielding slightly relative to one another to effect operation of the microswitch 234 when a jam occurs, and returning to their operative position immediately upon clearing of the jam so that the portion of the apparatus effected is not disturbed or thrown out of timed relation with respect to the remainder of the apparatus or of the elements of the machines for performing succeeding operations upon successive bottles passing therethrough. A similar safety control unit, indicated generally at 196, may likewise be provided for cooperation with the driving shaft 126 and its spindle 290 upon which the transfer disk 58 is mounted for transferring the bottles from the filling machine 12 to the capping machine 14, the operating elements and mode of operation being substantially the same as in the control unit 194, above described. The control unit 196 is arranged to cooperate with a second microswitch 292, the microswitches being arranged in parallel, as shown in Fig. 13, so that in operation the circuit to the solenoid 250 may be closed upon operation of either microswitch.

A third microswitch 294, also included in the parallel circuit to the solenoid 250 is arranged to cooperate with the driving and driven elements 296, 298 of a third safety control unit 192 illustrated in detail in Fig. 9, wherein the driving element 296 fast on the shaft 146 is rotated in a clockwise direction by the chain and sprocket drive 144, and the driven element 298 forms a part of a spindle 300 upon which the pinion 148 is mounted for driving the cleaning machine 10. Thus, in the operation of the machine, any abnormal or excessive load occurring at the cleaning machine, such as may be caused by a jam at the intake or discharge spiders 28, 36 will likewise be detected by the safety control unit 192 to effect termination of operation of the machine.

Referring now particularly to Figs. 11 and 12, a modified form of safety control unit adapted to terminate operation of the apparatus immediately upon detection of an abnormal load at selected points of the apparatus may comprise pneumatically operated control mechanism, indicated generally at 302, for effecting operation of a switch to close the circuit to the solenoid 250. As herein shown, the general arrangement of the driving and driven elements 304, 306 may be substantially similar to that above described, the driving element 304 having opposed radially extended fins 308, 310, the fin 308 being arranged for cooperation with a spring pressed plug unit 312 and set screw 314. The opposed radial fin 310 is arranged to cooperate with the pneumatically operated control mechanism 302 which, as herein shown, includes a conduit member 316 carried by the driven element 306 and through which air under substantial pressure may be caused to flow to be discharged through a small orifice 318. The conduit 316 is provided with a restricted throat portion 320 spaced in advance of the discharge orifice 318 and arranged to offer a substantial resistance to the flow of air therethrough, and the control mechanism is further provided with a flat headed pin 322 carried by the fin 310 of the driving element 304 and, in effect, constituting a valve for opening and closing the discharge orifice. With this arrangement upon minute movement of the driving element 304 relative to the driven element 306, the valve 322 operates to open the discharge orifice 318 a minute amount, such for example as .001 of an inch, thereby effecting a substantial pressure drop in the portion 324 of the conduit between the discharge orifice 318 and the throat 320. Provision is made for utilizing such pressure drop for effecting operation of a switch to close the circuit to the solenoid 250 to effect disengagement of the clutch and application of the brake to terminate operation of the machine, as above described.

As herein shown, the control mechanism for effecting closing of the circuit to the solenoid 250 includes a magnetic type switch 326 of known construction arranged to cooperate with a magnet 328, forming part of the pneumatically operated control mechanism, of such structure as to be actuated by movement of the driving element 304 relative to the driven element 306 through a very minute distance. One available form of magnetic switch comprises a pair of contacts sealed in a glass tube and having a pool of mercury at the lower end of the tube. One of the contacts is fixed in the mercury, the other being movable into and out of the mercury by the influence of the magnet 328 to open and close the circuit to the solenoid 250. The magnetic switch 326 may be of the normally closed type and is arranged to be held in its open position by the magnet 328 when the latter is disposed in a vertical position, as illustrated in Fig. 11. The magnet is operatively connected to one end of a Bourdon tube 330, the other being connected to the conduit unit 316 by a tube 332 which communicates with an annular chamber 333 formed in a stationary disk 335 interposed between the underside of the machine frame and the upper face of the driven member 306. A pipe 337, also in communication with the chamber 333 is connected to the conduit unit 316, as shown. Air under pressure may be supplied to the conduit unit 316 by any usual or preferred form of regulated air supply through a tube 334 which communicates with a second chamber 339 formed in the disk 335. A pipe 341, also in communication with the chamber 339 is connected to the conduit unit 316, as illustrated. The valve 322 is normally in contact with the discharge orifice 318, as shown, to close the orifice and maintain a predetermined pressure in the Bourdon tube and to thus maintain the magnet 328 in its vertical position to hold the magnetic switch 326 open. In the operation of the pneumatically operated control mechanism, in the event of a jam or resistance to rotation of the driven element 306 sufficient to effect relative movement of the driven and driving elements, the valve 322 will move a minute distance away from the discharge end of the conduit to immediately effect a substantial reduction in the air pressure in the Bourdon tube, and as a result the magnet 328 is caused to be instantly rocked to the right to permit the switch 326 to close and immediately energizing the solenoid 250 to effect termination of operation of the machine.

From the above description it will be seen that the present safety control mechanism for container handling machines enables the operation of the machine to be immediately terminated in response to an excessive or abnormal load or resistance to rotation at a plurality of predetermined and selected points of the apparatus in the event of a jam at such selected points whereby to prevent breaking of the containers or damage to the machine without displacement of the operating elements relative to each other and without disturbing the timed relationship therebetween. It will also be observed that the present control mechanism is of particular advantage in a container handling machine having two or more container transferring spiders arranged in interlocking and timed relation, the control mechanism effecting termination of operation of the machine substantially instantly upon detection of an abnormal resistance to rotation of the spiders whereby to prevent dislocation of the spiders relative to the driving elements or the cooperating transfer elements. It will be further observed that the driving and driven elements of each detecting unit may be adjusted to effect termination of operation of the machine at different predetermined resistances to rotation at the selected points of the machine, and that any excessively abnormal resistance occurring at any other point in the machine will effect release of the overload safety unit 70 of the main driving connections.

While the preferred embodiment of the invention has been herein illustrated and described, it will be understood that the invention may be embodied in other forms within the scope of the following claims.

This application is a division of my copending application, Serial No. 132,242, filed December 10, 1949, and now Patent No. 2,762,497.

Having thus described the invention, what is claimed is:

1. Container moving mechanism, drive means therefor, control means including a plurality of coupling units, each having relatively movable driving and driven elements, said units being disposed at a plurality of different points for selectively detecting an abnormal resistance to the container movement at such points, and solenoid operated means cooperating with said drive means and responsive to said detecting means for immediately terminating operation of the machine when an abnormal resistance to the container movement occurs at any of such points, said control means including an electrical circuit having a switch for each coupling unit, pneumatically operated means responsive to relative movement of said coupling elements for actuating said switch, said pneumatically operated means being arranged to effect closing of its switch to energize said solenoid upon a minute relative movement of said coupling elements.

2. Container moving mechanism, drive means therefor, control means including a plurality of coupling units, each having relatively movable driving and driven elements, said units being disposed at a plurality of different points for selectively detecting an abnormal resistance to the container movement at such points, and solenoid operated means cooperating with said drive means and responsive to said detecting means for immediately terminating operation of the machine when an abnormal resistance to the container movement occurs at any of such points, said control means including an electrical circuit having a switch for each coupling unit, pneumatically operated means responsive to relative movement of said coupling elements for actuating said switch, said pneumatically operated means being arranged to effect closing of its switch to energize said solenoid upon a minute relative movement of said coupling elements, and means for adjusting said coupling units to permit relative movement of their driving and driven elements at varying resistances at said different points.

3. Container moving mechanism, drive means therefor, control means including a plurality of coupling units, each having relatively movable driving and driven elements, said units being disposed at a plurality of different points for selectively detecting an abnormal resistance to the container movement at such points, and solenoid operated means cooperating with said drive means and responsive to said detecting means for immediately terminating operation of the machine when an abnormal resistance to the container movement occurs at any of such points, said control means including an electrical circuit having a switch for each coupling unit, pneumatically operated means responsive to relative movement of said coupling elements for actuating said switch, said pneumatically operated means effecting the closing of its switch to energize said solenoid upon a minute relative movement of said coupling elements, said pneumatically operated means including a conduit carried by said driven element through which air under substantial pressure may flow, said conduit having a small discharge orifice, a restricted throat portion spaced in advance of the discharge orifice for offering a substantial resistance to the flow of air therethrough and a valve carried by the driving element for opening and closing the discharge orifice whereby to effect a substantial pressure variation in the conduit between the orifice and the throat, and connections between said conduit and said switch for actuating the switch upon occurrence of such pressure variation.

No references cited.